Patented Dec. 22, 1936

2,064,875

UNITED STATES PATENT OFFICE 2,064,875

AIR DRYING COMPOSITION OF THE ALKYD RESIN TYPE

Howard L. Bender, Bloomfield, N. J., assignor to Bakelite Corporation, New York, N. Y., a corporation of Delaware No Drawing. Application July 11, 1933, Serial No. 679,991

4 Claims. (Cl. 134—26)

This invention relates to synthetic resinous compositions that are primarily intended for use as coatings or impregnations and have the property of drying in air to commercially usable films for the protection of structural parts, car bodies, implements, etc. from atmospheric effects, where the conditions of use or application are such that an after-heating or baking of the films is impractical or impossible.

The synthetic resinous compositions with which this invention is concerned are differentiated from natural or other resins by an initial or potentially reactive or soluble and fusible A stage and gradually convertible or hardenable by heat to a final infusible insoluble or C stage. These resinous compositions include the phenolic aldehyde, the glycerol-polybasic and the urea or thio-urea-aldehyde products; and to distinguish them from the permanently fusible soluble resins, the term resinoid has been adopted and is so used herein.

In a prior application Serial No. 636,955 filed October 8, 1932 now Patent 1,922,272 there is more particularly described and claimed resinoid compositions of the phenolic type. The present application which is a continuation-in-part of the above mentioned application is specifically directed to resinoids of the polyhydric alcohol-polybasic acid type and sometime designated as alkyd resins. Varnishes prepared therefrom deposit films or coatings which, upon evaporation of the volatile content, are non-tacky, adhere firmly to the base material and having a pleasing homogeneous translucent appearance; furthermore, the films or coatings show a marked resistance to sunlight, water penetration and weak alkaline or soap solutions. An additional characteristic of these varnishes and of manifest importance is the comparative ready release of sufficient solvents from the film forming body with the consequence that a film dries to a non-tacky condition in a surprisingly short period of time.

In order that the present invention may be fully disclosed, a specific example relating to the preparation of varnishes follows, but it is to be understood that the conditions and proportions are illustrative only and are subject to change commensurate in scope with the appended claims.

*Example.*—A resinoid of the polyhydric alcohol-polybasic acid type is obtained by reacting 92 parts or 1 mol. of glycerine with 184 parts or from 1¼ to 1½ mols of phthalic anhydride until the temperature reaches about 200 to 220° C.; the water is allowed to escape until a sample shows a resin which is solid when cold, or with the above proportions until about 36 parts of water have been driven off. Then 50 parts of diethyl oxylate, glycol diacetate or other known suitable medium boiling point solvents or high boiling point solvents, such as the high boiling ketones, the diethyl or dibutyl esters of phthalic, tartaric or similar organic acids, is added and the mass is refluxed until a sample shows a liquid condition at about 180° C. but gels upon cooling. At this point sufficient volatile solvent, as for example 200 parts of acetone, cellosolve (monoethyl ether of ethylene glycol), or their mixtures with alcohol, etc. are added to make a varnish of about 50 per cent solid content. The varnish if of low viscosity is refluxed until a sample shows a viscosity of 500 centipoises or more measured in 50 per cent solution. The varnish so made when tested is found to be non-penetrating or but slightly penetrating when applied to kraft paper. Glycol or polyglycerine may be used to replace all or part of the glycerine and any dibasic or polybasic organic acid or acid anhydride may be used in place of phthalic anhydride; monobasic organic acids, particularly those of the fatty acid groups having some unsaturated carbons present, may be substituted for part of the polybasic acid. Acids, such as sebacic and adipic, may be included to give special properties such as increased flexibility.

In the step of refluxing the resinoid while dissolved in diethyl oxalate or other known suitable solvent there is an advancement of the resinoid toward a hardened or polymerized condition indicated by a liquid condition when hot and a gelling of a sample when cold. The further refluxing in the presence of volatile solvent causes additional polymerization or hardening as shown by the increase in viscosity.

The extent of advancement or degree of polymerization of the resinoid found desirable has no well defined critical limits except that gelling of the mass as a whole is to be avoided. In general the viscosity at 500 centipoises in the finished varnish when adjusted to a 50 per cent solid content is indicative of sufficient advancement to insure the deposition of a film having requisite toughness and durability upon drying in air. Such a varnish shows substantially no penetration when applied to kraft paper of 5 mils thickness. Since the resinoid in the reacted or advanced condition is insoluble for all practical purposes in a solvent such as acetone, the advancement in such a solvent results largely in a colloidal suspension or dispersion, the extent of which is manifested by the lack of penetration. This colloidal condition is further evidenced by the fact that, although the solvent and the contained resinoid when sufficiently advanced by heating may have the appearance of a true solution, further additions of the same solvent result in a precipitation of the resinoid.

While this invention is not limited as to the solvents which can be used, it is particularly adapted to the use and inclusion of high boiling solvents which remain in the final product, and such solvents and plasticizers can therefore be chosen as will impart plasticity and flexibility or other desirable qualities to the film or coating as well as render possible the advancement of the resinoid therein. A list of solvents for this purpose includes most of the well-known plasticizers as the esters, diamyl phthalate, ethyl abietate, etc., as well as many other compounds not generally classed as plasticizers as oils, fatty acids, etc.; in fact any of the known non-resinous solvents are suitable for the purpose.

I claim:

1. Process of preparing coating compositions which comprises reacting a polyhydric alcohol with a polybasic acid to the point where a sample solidifies when cold, adding a high boiling solvent, refluxing the solution until a sample in a liquid condition at about 180° C. gels upon cooling, adding a volatile solvent in proportion to form a varnish of about 50 per cent solid content and refluxing the varnish to a viscosity of about 500 centipoises or more.

2. Process of preparing coating compositions drying in air by evaporation of solvent to a non-tacky film, which comprises reacting a polyhydric alcohol with a polybasic acid to the point where a sample solidifies when cold, adding a high boiling solvent, refluxing the solution until a sample in a liquid condition at about 180° C. gels upon cooling, adding a volatile solvent to form a varnish and refluxing the varnish until it shows a viscosity of at least 500 centipoises when adjusted to a solid content of 50 per cent.

3. Process of preparing a coating composition which comprises reacting a polyhydric alcohol with a polybasic acid to the point where a sample solidifies when cold, and refluxing the reaction product in the presence of a solvent until it shows a viscosity of at least 500 centipoises when adjusted to a solid content of 50 percent, thereby producing a composition which deposits a non-tacky film upon evaporation of solvent.

4. A liquid coating composition comprising a resinoid of the polyhydric alcohol-polybasic acid type and a solvent medium, the resinoid being advanced to a condition such that the composition shows a viscosity of at least 500 centipoises when adjusted to a solid content of 50 percent, the composition being substantially non-penetrative when applied to kraft paper and depositing a non-tacky film upon evaporation of solvent.

HOWARD L. BENDER.